United States Patent
Hirasawa

(10) Patent No.: US 10,694,161 B2
(45) Date of Patent: Jun. 23, 2020

(54) ILLUMINATION APPARATUS AND METHOD OF CONTROLLING ILLUMINATION APPARATUS

(71) Applicant: CANON KABUSHIKI KAISHA, Tokyo (JP)

(72) Inventor: Ginta Hirasawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/181,057

(22) Filed: Nov. 5, 2018

(65) Prior Publication Data
US 2019/0149790 A1    May 16, 2019

(30) Foreign Application Priority Data
Nov. 14, 2017    (JP) .................................. 2017-219342

(51) Int. Cl.
| H04N 5/235 | (2006.01) |
| H04N 5/225 | (2006.01) |
| H04N 9/73 | (2006.01) |
| H04N 9/04 | (2006.01) |

(52) U.S. Cl.
CPC ........... *H04N 9/735* (2013.01); *H04N 5/2256* (2013.01); *H04N 5/2352* (2013.01); *H04N 5/2354* (2013.01); *H04N 9/045* (2013.01)

(58) Field of Classification Search
CPC ...... H04N 9/735; H04N 9/045; H04N 5/2354; H04N 5/2256; H04N 5/2352
See application file for complete search history.

(56) References Cited

U.S. PATENT DOCUMENTS

| 10,154,256 | B1* | 12/2018 | Segapelli | ............. | H04N 17/002 |
| 2004/0075762 | A1* | 4/2004 | Okubo | .................. | H04N 5/2354 348/371 |
| 2005/0063195 | A1* | 3/2005 | Kawakami | ............. | G03B 15/05 362/545 |
| 2005/0099529 | A1* | 5/2005 | Hattori | .................. | H04N 5/2256 348/370 |
| 2006/0067668 | A1* | 3/2006 | Kita | ........................ | G03B 15/05 396/182 |
| 2008/0075447 | A1* | 3/2008 | Wernersson | ........... | G03B 15/05 396/155 |
| 2009/0231463 | A1* | 9/2009 | Hsieh | ...................... | G03B 15/05 348/224.1 |
| 2010/0201840 | A1* | 8/2010 | Ajito | ..................... | H04N 5/2354 348/223.1 |

(Continued)

FOREIGN PATENT DOCUMENTS

JP    2668983 B2    10/1997

*Primary Examiner* — Abdelaaziz Tissire
(74) *Attorney, Agent, or Firm* — Canon U.S.A., Inc. I.P. Division

(57) ABSTRACT

An illumination apparatus makes it possible to properly perform white balance (WB) processing that is image processing for WB correction on the premise of an illumination apparatus that uses a specific light source. The illumination apparatus includes a light source using a light-emitting diode (LED) and a transmitter configured to transmit color information relating to the LED, and the transmitter transmits, as the color information relating to the LED, color information that compensates a difference between spectral characteristics of the specific light source and spectral characteristics of the LED.

7 Claims, 11 Drawing Sheets

(56) References Cited

U.S. PATENT DOCUMENTS

2013/0201362 A1\* 8/2013 Chino .................... H04N 9/735
  348/223.1
2014/0009671 A1\* 1/2014 Ozone .................. H04N 5/2251
  348/371

\* cited by examiner

FIG.7

|  | WHITE LED | Xe TUBE | WHITE LED/ Xe TUBE |
|---|---|---|---|
| Red | 0.66 | 0.65 | 101% |
| Green | 1.27 | 1.07 | 119% |
| Blue | 1.00 | 1.00 | 100% |

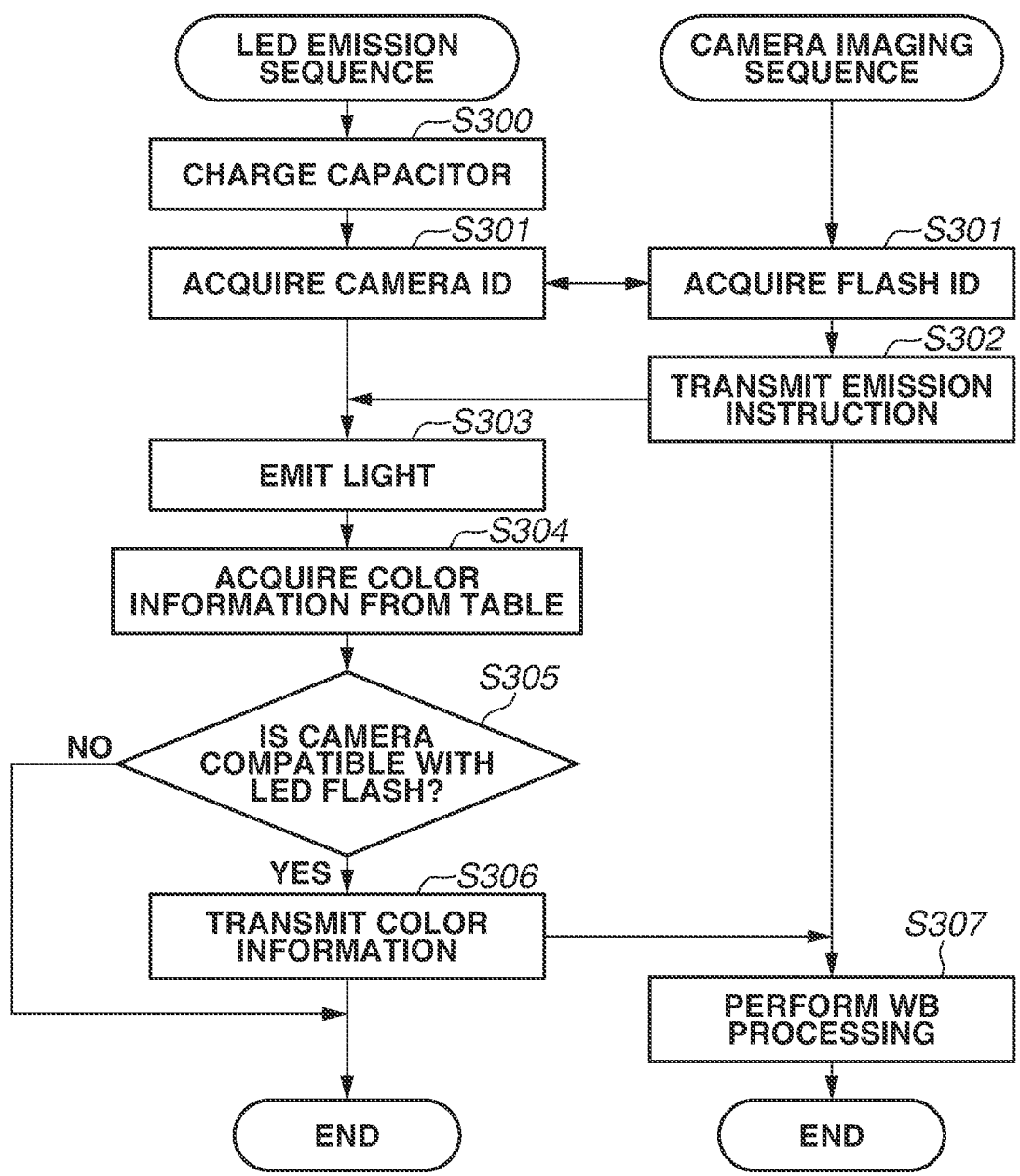

ILLUMINATION APPARATUS AND METHOD OF CONTROLLING ILLUMINATION APPARATUS

BACKGROUND OF THE INVENTION

Field of the Invention

The present disclosure relates to an illumination apparatus that uses a light-emitting diode (LED) as a light source.

Description of the Related Art

When an imaging is performed by an imaging apparatus by using an illumination apparatus such as a flash apparatus, white balance (hereinafter, WB) processing of image data is generally performed using color information of emission color of the flash apparatus (Japanese Patent No. 2668983). As a light source of the flash apparatus, a xenon (Xe) tube has been commonly used; however, a flash apparatus using an LED as a light source has been proposed in recent years. In the camera discussed in Japanese Patent No. 2668983, however, the WB processing of the image data is performed on the premise of spectral characteristics of the Xe tube, and mounting of the flash apparatus using the LED as the light source is not considered. The Xe tube and the LED are different in spectral characteristics from each other. Therefore, difference of the spectral characteristics cannot be expressed by color information that is conventionally used and is two-dimensionally expressed in a format of chromaticity and color temperature. Accordingly, proper WB correction is not realized due to influence of deviation in the spectral characteristics between the Xe tube and the LED.

SUMMARY OF THE INVENTION

The present disclosure is directed to an illumination apparatus that can properly perform WB processing that is image processing for WB correction on the premise of the illumination apparatus that uses a specific light source.

According to an aspect of the present disclosure, an illumination apparatus includes a light source using a light-emitting diode (LED) and a transmitter configured to transmit color information relating to the LED, and the transmitter transmits, as the color information relating to the LED, color information that compensates a difference between spectral characteristics of a specific light source and spectral characteristics of the LED.

Further features of the present disclosure will become apparent from the following description of exemplary embodiments with reference to the attached drawings.

BRIEF DESCRIPTION OF THE DRAWINGS

FIG. 7 is a diagram illustrating color information correction coefficients α of respective colors.

FIG. 11 is a flowchart illustrating an operation sequence of an imaging system according to a third exemplary embodiment of the present disclosure.

DESCRIPTION OF THE EMBODIMENTS

An example of an imaging system according to an exemplary embodiment of the present disclosure is described below with reference to drawings.

Figure 1:
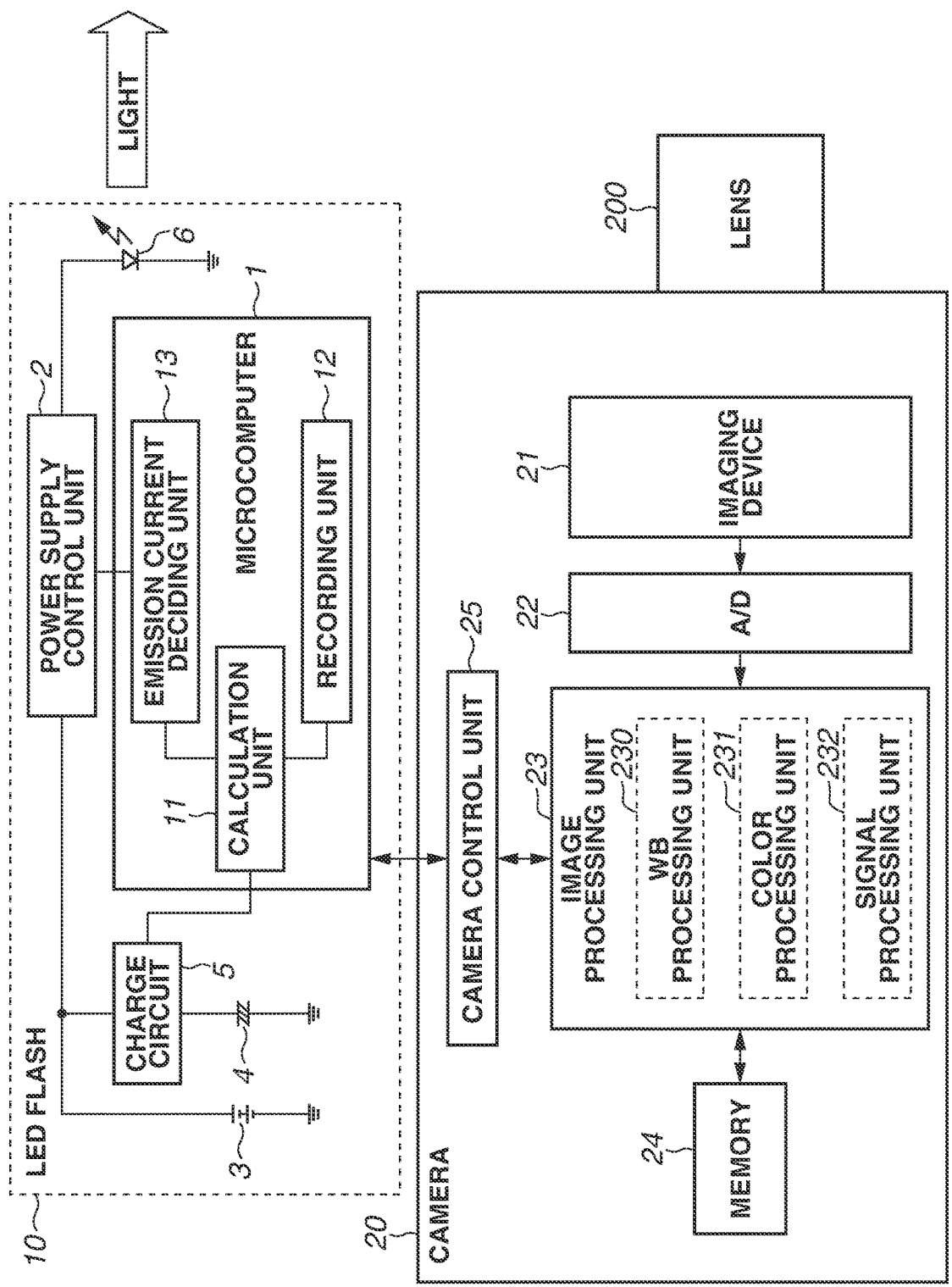
FIG. 1 is a configuration diagram of an imaging system according to a first exemplary embodiment of the present disclosure.

FIG. 1 is a configuration diagram of an imaging system in which a light-emitting diode (LED) flash 10 serving as an illumination apparatus is mounted on a camera 20 serving as an imaging apparatus, according to a first exemplary embodiment of the present disclosure.

A configuration of the LED flash 10 is first described. A microcomputer 1 performs ON/OFF control of an LED drive circuit, calculation of color information of an LED 6 serving as a light source, decision of an LED drive condition, etc. Further, the microcomputer 1 receives an emission instruction from a camera control unit 25 of the camera 20 described below to perform emission control, and transmits the calculated color information of the LED 6 to the camera control unit 25 as well.

A power supply 3 supplies power by a battery. A capacitor 4 is charged by the power supply 3 through a charge circuit 5, and an electric double-layer capacitor is used as the capacitor 4 in the present exemplary embodiment. A power supply control unit 2 uses the capacitor 4 as an input power supply, and drives, by a current, the LED 6 connected to the output side of the power supply control unit 2 according to an instruction by an emission current deciding unit 13. In the present exemplary embodiment, the power supply control unit 2 uses a stepdown switching converter circuit, the input side thereof is connected to the capacitor 4, and output side thereof is connected to the LED 6. A calculation unit 11 reads color information corresponding to the drive condition of the LED 6 decided by the emission current deciding unit 13, from a color information table recorded in a recording unit 12 serving as a memory.

Next, a configuration of the camera 20 is described. An imaging device 21 is an imaging device such as a complementary metal-oxide semiconductor (CMOS) sensor or a charge-coupled device (CCD) sensor that photoelectrically converts an object image as an optical image formed by an imaging lens 200 and outputs an electric signal. An analog-to-digital (A/D) conversion unit 22 converts an analog electric signal output from the imaging device 21 into a digital signal. An image processing unit 23 performs various kinds of image processing on the digital signal to generate an image. The image processing unit 23 includes a white balance (WB) processing unit 230, a color processing unit 231, and another signal processing unit 232. The WB processing unit 230 multiplies, by a corresponding gain, a color signal of each of colors R, G, and B configuring the image provided to the image processing unit 23, thereby adjusting a color ratio of R, G, and B (WB processing). The color processing unit 231 performs adjustment of color density and color tone, and color conversion processing using a three-dimensional lookup table (3D-LUT), etc. Furthermore, the signal processing unit 232 performs development processing such as pixel interpolation processing, brightness adjustment processing, and gamma processing. A memory 24 stores various kinds of data described below used by the WB processing unit 230. In a case where imaging is performed by making the LED 6 of the LED flash 10 emit light, the WB processing unit 230 uses color information transmitted from the LED flash 10 to perform the WB processing.

In the present exemplary embodiment, it is assumed that the camera 20 is a camera that performs the WB processing on the premise of a xenon (Xe) tube light source as a specific light source and is not compatible with the WB processing for the LED light source (hereinafter, incompatible camera). The present exemplary embodiment enables the camera 20 to perform proper WB processing when the LED flash 10 is mounted on the incompatible camera and imaging is performed.

Detail of an issue to be solved is described. As described above, the Xe tube and the LED are different in spectral characteristics from each other. Difference of the spectral characteristics therebetween is described with reference to FIG. 3. The Xe tube has rich characteristics and high color rendering property substantially over the entire visible region. In contrast, in the white LED placing importance on emission efficiency, white color is commonly created through composition of color by a blue LED and a color by a yellow phosphor, and color rendering property is not high. An existing flash apparatus transmits, as the color information, color temperature, $\Delta uv$, and chromaticity of emission color to the imaging apparatus; however, the difference of color rendering properties cannot be expressed by the existing color information. Even if the Xe tube and the white LED both emit white light with the same chromaticity, the spectral characteristics are different therebetween. Therefore, the difference of the spectral characteristics appears as WB deviation and proper colors are not obtainable by a combination of the LED flash and the incompatible camera that performs the WB processing on the premise of the Xe tube.

Figure 2:
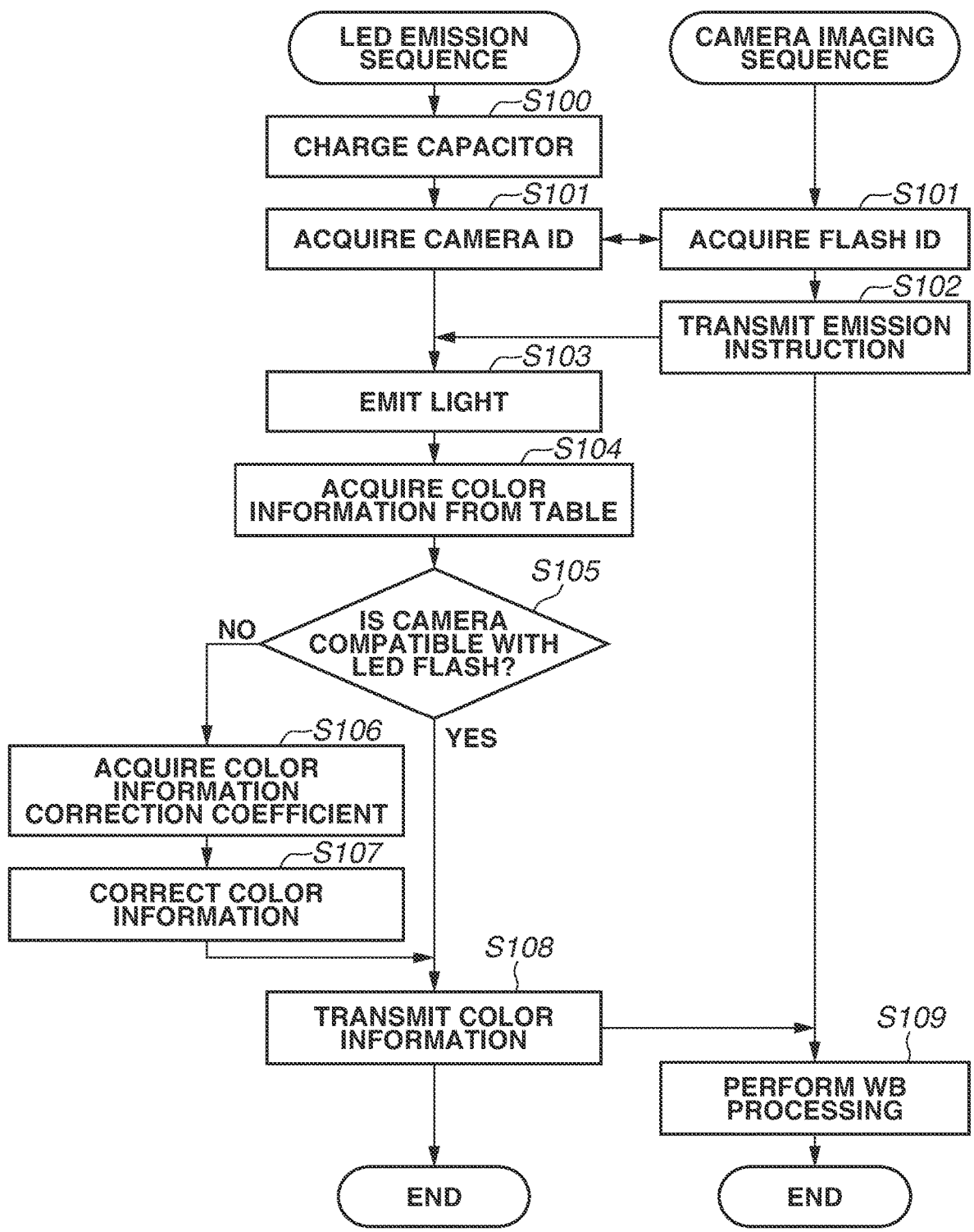
FIG. 2 is a flowchart illustrating an operation sequence of the imaging system according to the first exemplary embodiment of the present disclosure.

FIG. 2 is a flowchart illustrating an operation sequence of the imaging system according to the present exemplary embodiment, and illustrating operation of the LED flash 10 and the camera 20 in a case where imaging is performed by making the LED 6 of the LED flash 10 emit light. The flowchart in FIG. 2 is started in a state where the LED flash 10 and the camera 20 are connected to each other and power sources for the LED flash 10 and the camera 20 are turned on.

In step S100, the microcomputer 1 starts charging of the capacitor 4 from the power supply 3 through the charge circuit 5.

When an unillustrated shutter button of the camera 20 is operated, the microcomputer 1 and the camera control unit 25 perform communication with each other and respectively acquire a camera identification (ID) and a flash ID in step S101. The ID information acquired at this time is used to determine whether a light source of the connected illumination apparatus is an LED or an Xe tube on the imaging apparatus side and to determine whether the imaging apparatus can perform the WB processing compatible with the LED on the illumination apparatus side.

Next, the camera 20 performs photometry and ranging operation of an object. Description of the operation is omitted because the operation is known control. Thereafter, in step S102, the camera control unit 25 transmits, to the LED flash 10, an emission instruction decided by a result of the photometry and imaging condition setting in the camera 20. Communication contents of the emission instruction includes an emission amount, an emission time, and timing information of an exposure start time.

In step S103, the microcomputer 1 controls the emission current deciding unit 13 to perform light emission of the LED 6 according to the emission instruction.

In step S104, the microcomputer 1 reads the color information from the color information table recorded in the recording unit 12, based on the condition of the emission instruction acquired in step S103. In the present exemplary embodiment, the color information is (R0, G0, and B0) expressed by RGB.

In step S105, the microcomputer 1 determines whether the camera ID acquired in step S101 indicates a camera capable of performing the WB processing compatible with the LED (hereinafter, compatible camera). In a case where the camera is determined as an incompatible camera (NO in step S105), it is necessary to correct the color information. Therefore, the processing proceeds to step S106. In a case where the camera is determined as a compatible camera (YES in step S105), the processing proceeds to step S108 without correcting the color information.

In step S106, the microcomputer 1 reads a color information correction coefficient $\alpha$ recorded in the recording unit 12. The color information correction coefficient $\alpha$ is varied depending on spectral sensitivity of the imaging device, and is accordingly varied depending on the camera. Therefore, the microcomputer 1 identifies the camera based on the camera ID acquired in step S101, and reads the color information correction coefficient $\alpha$ recorded in a table.

The color information correction coefficient $\alpha$ is determined in the following manner and is previously recorded in the table. The color information correction coefficient $\alpha$ compensates the difference of the spectral characteristics between the white LED and the Xe tube. A method of determining the color information correction coefficient $\alpha$ is described with reference to FIG. 3 to FIG. 7.

Figure 3:
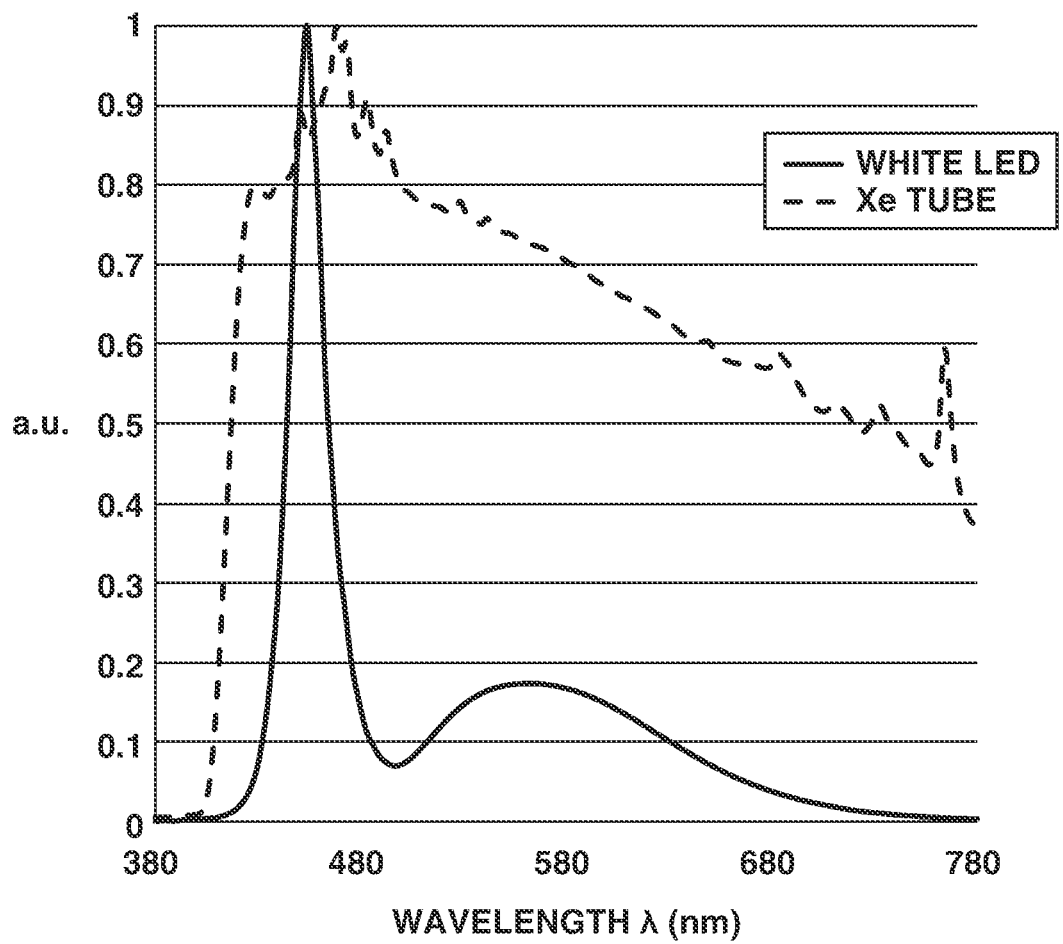
FIG. 3 is a graph illustrating comparison of spectral characteristics between a white light-emitting diode (LED) and a xenon (Xe) tube.
Figure 4:
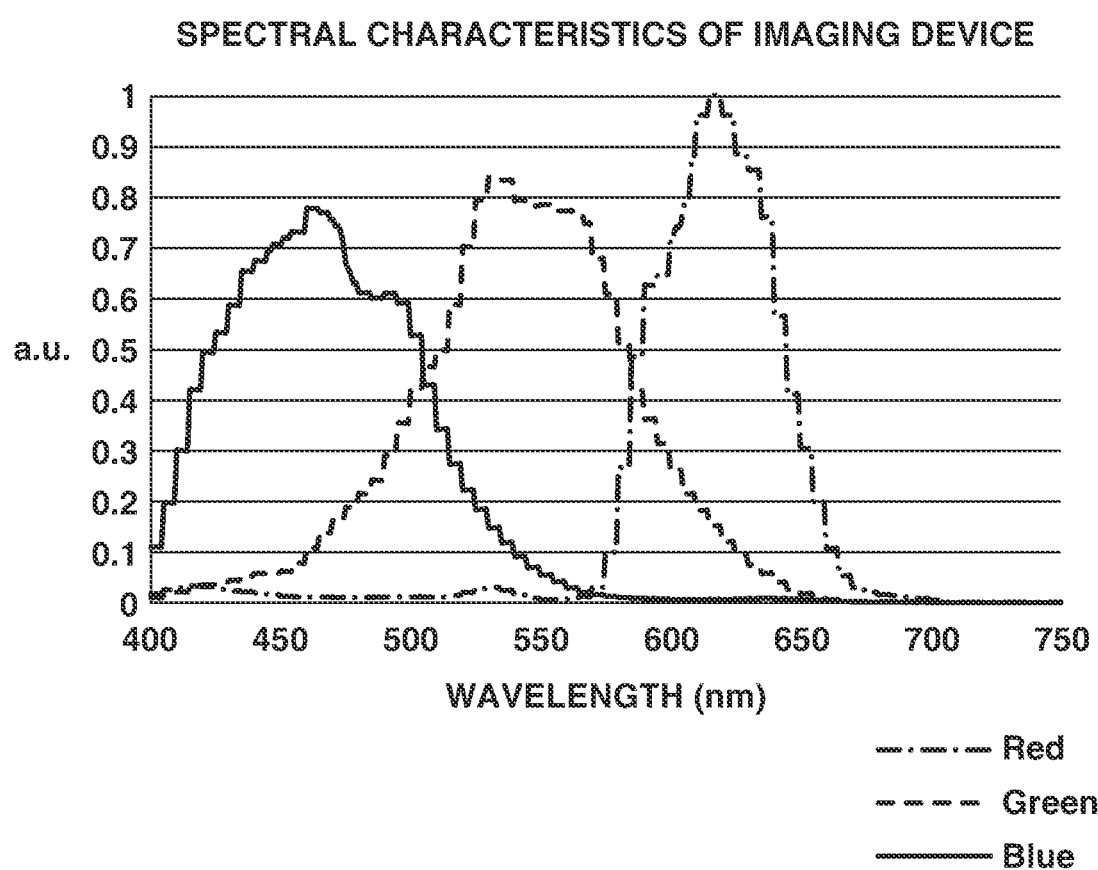
FIG. 4 is a graph illustrating spectral sensitivity characteristics of an imaging device.
Figure 5:
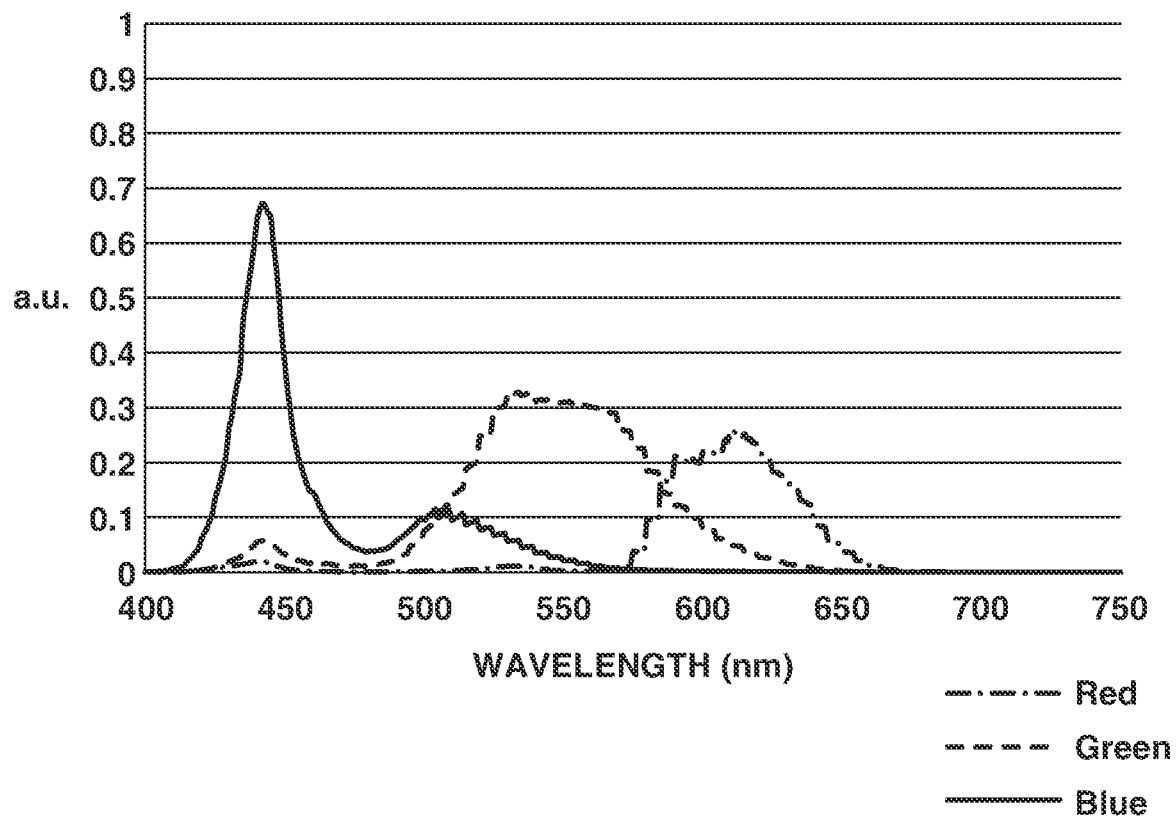
FIG. 5 is a graph illustrating spectral sensitivity outputs of the imaging device in a case where the white LED is used as a light source.
Figure 6:
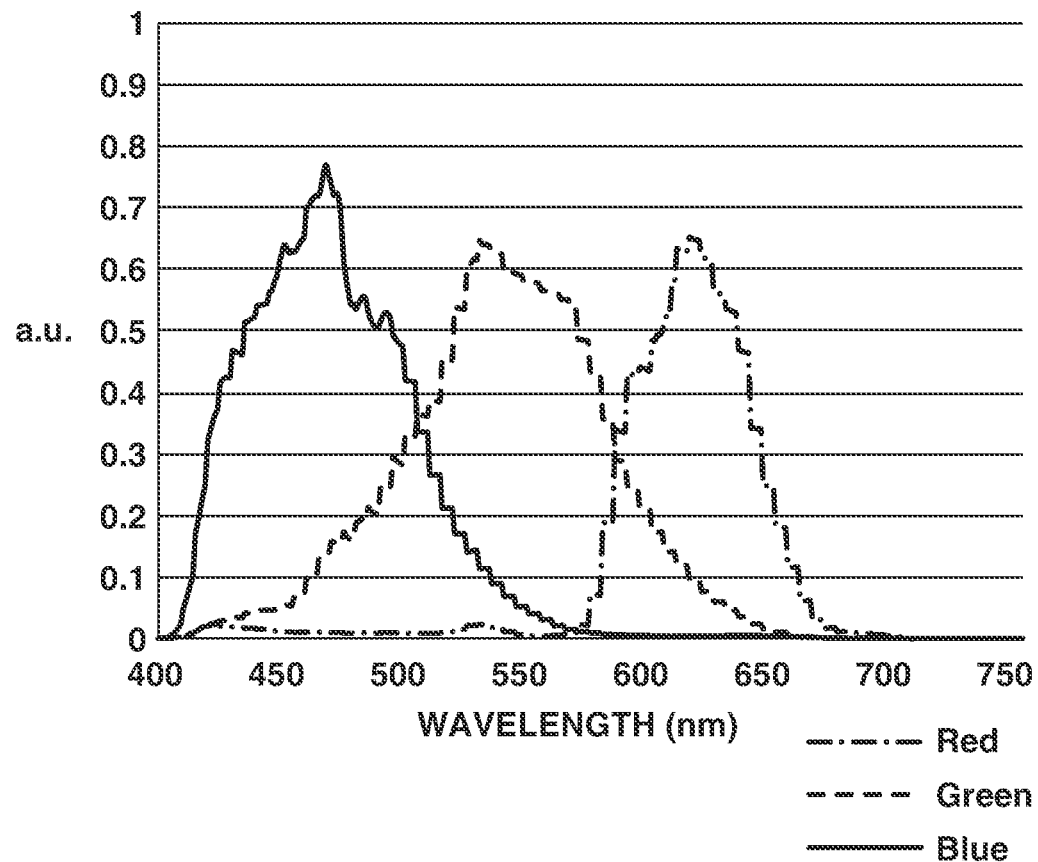
FIG. 6 is a graph illustrating the spectral sensitivity outputs of the imaging device in a case where the Xe tube is used as a light source.

FIG. 3 is a graph illustrating comparison of the spectral characteristics between the white LED and the Xe tube. FIG. 4 is a graph illustrating spectral sensitivity characteristics of the imaging device. FIG. 5 is a graph illustrating spectral sensitivity outputs of the imaging device in a case where the white LED is used as a light source, and a white LED sensitivity coefficient is denoted by w. A table in FIG. 5 illustrates output values of the white LED sensitivity coefficient w for Red, Green, and Blue. FIG. 6 is a graph illustrating the spectral sensitivity outputs of the imaging device in a case where the Xe tube is used as a light source, and an Xe tube sensitivity coefficient is denoted by x. A table in FIG. 6 illustrates output values of the Xe tube sensitivity coefficient x for Red, Green, and Blue. FIG. 7 is a diagram illustrating color information correction coefficients $\alpha$ of respective colors. Each of the color information correction coefficients $\alpha$ is determined by dividing the white LED sensitivity coefficient w by the Xe tube sensitivity coefficient x. In FIG. 7, the color information correction coefficient $\alpha$ for Red is +1%, and the color information correction coefficient α for Green is +19%, based on the color information correction coefficient α for Blue.

With reference to the flowchart in FIG. 2 again, in step S107, the microcomputer 1 determines, by the following expressions 1 to 3, corrected color information (R1, G1, and B1) from the color information (R0, G0, and B0) acquired in step S104 and the color information correction coefficients α acquired in step S106.

$$R1=R0 \div 1.01 \quad \text{(Expression 1)}$$

$$G1=G0 \div 1.19 \quad \text{(Expression 2)}$$

$$B1=B0 \div 1 \quad \text{(Expression 3)}$$

In step S108, the microcomputer 1 transmits the color information acquired in step S104 or the color information determined in step S107, to the camera 20.

In step S109, the WB processing unit 230 performs the WB processing by using the color information transmitted in step S108 from the LED flash 10. In this case, since the camera 20 is the incompatible camera, the WB processing is performed on each of the RGB pixels by multiplying the color information (R1, G1, and B1) by the corresponding WB coefficient. The WB coefficient is a value matched to sensitivity of each of the colors RGB of the imaging device 21, and is varied depending on the color. The WB coefficients are decided according to the characteristics of the imaging device 21, and are stored in the memory 24. The WB coefficients for R, G, and B respectively are denoted by WbGainR, WbGainG, and WbGainB, and the R, G, and B values before the WB processing respectively are denoted by PRERED, PREGREEN, and PREBLUE. When the R, G, and B values after the WB processing respectively are denoted by RED, GREEN, and BLUE, the WB processing is expressed by expressions 4 to 6.

$$\text{RED}=Wb\text{Gain}R \times R1 \times \text{PRERED} \quad \text{(Expression 4)}$$

$$\text{GREEN}=Wb\text{Gain}G \times G1 \times \text{PREGREEN} \quad \text{(Expression 5)}$$

$$\text{BLUE}=Wb\text{Gain}B \times B1 \times \text{PREBLUE} \quad \text{(Expression 6)}$$

After the WB processing, pixel interpolation processing, brightness adjustment processing, and gamma processing are performed by the color processing unit 231 and the signal processing unit 232, in addition to color space conversion processing using a 3D-LUT. Description of the processing is omitted because the processing is known technology.

The color information of light is calculated using the format of RGB in this case; however, the format of the color information is not limited to RGB.

The above-described sequence makes it possible to realize proper WB processing even in the case where the illumination apparatus including the LED light source is mounted on the camera incompatible with the LED light source.

In a second exemplary embodiment, an example in which a plurality of LEDs 6 is provided in the LED flash 10 and emits light of a plurality of (two or more) different emission colors is described.

Figure 8:
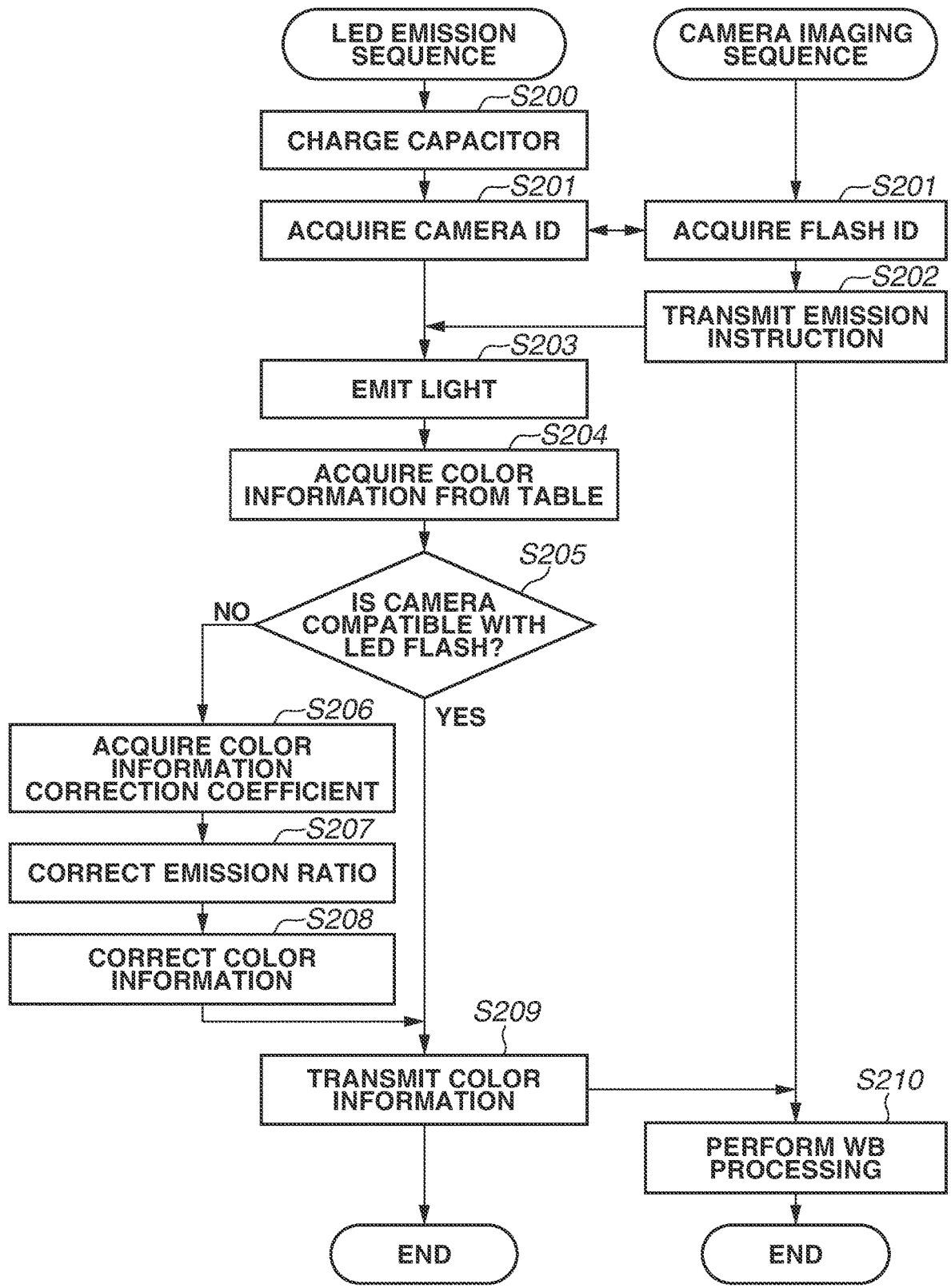
FIG. 8 is a flowchart illustrating an operation sequence of an imaging system according to a second exemplary embodiment of the present disclosure.
Figure 9:
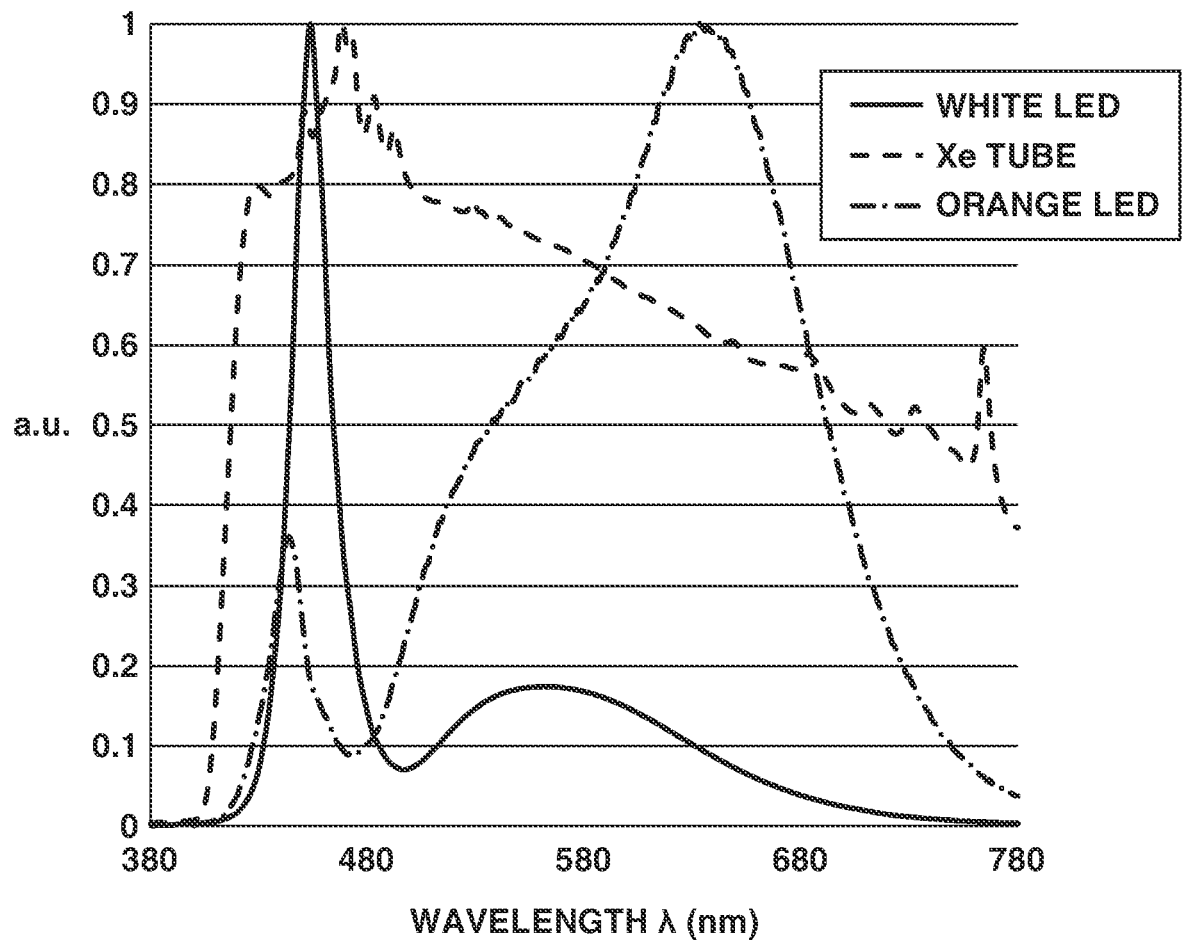
FIG. 9 is a graph illustrating comparison of spectral characteristics of an orange LED, the white LED, and the Xe tube.
Figure 10:
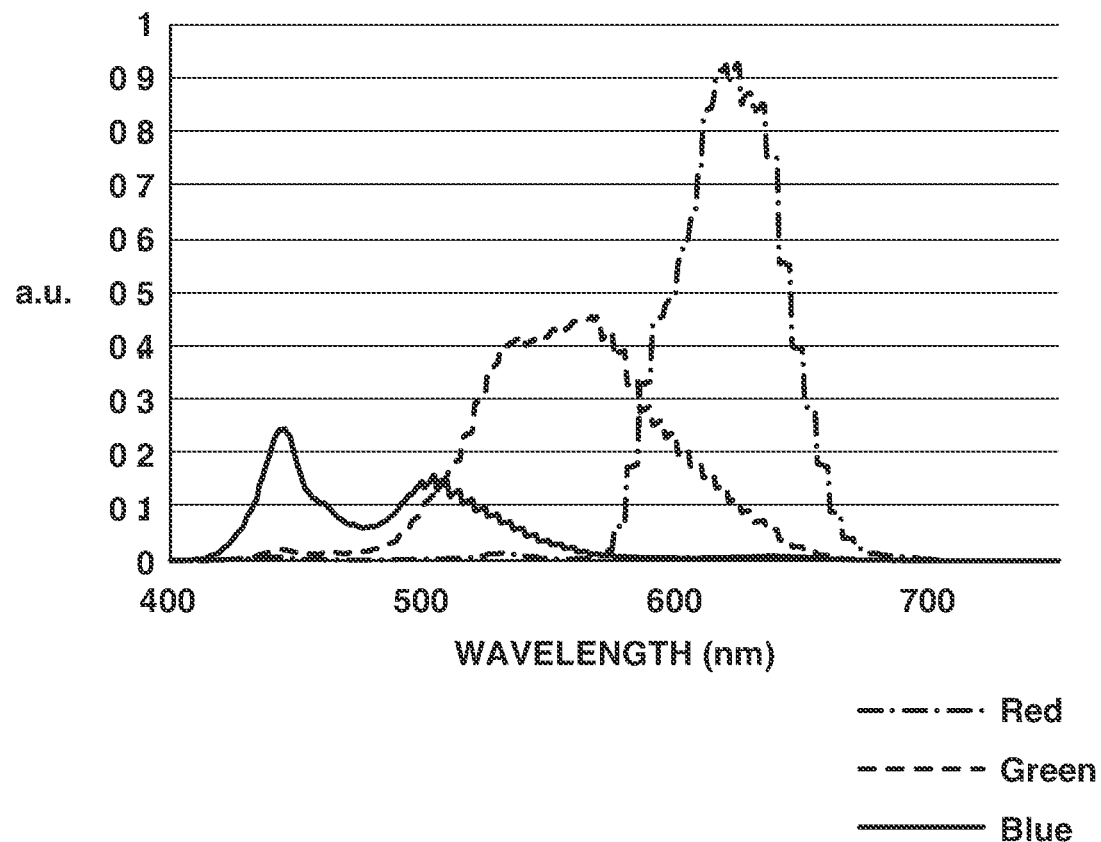
FIG. 10 is a graph illustrating the spectral sensitivity outputs of the imaging device in a case where the orange LED is used as a light source.

FIG. 8 is a flowchart illustrating an operation sequence of an imaging system according to the present exemplary embodiment, and illustrating operation of the LED flash 10 and the camera 20 in a case where imaging is performed by making the LEDs 6 of the LED flash 10 emit light of the plurality of emission colors. In the present exemplary embodiment, the LEDs 6 includes luminous bodies of two colors, i.e., the white LED used in the first exemplary embodiment and an orange LED in which a red phosphor is mixed to the white LED to enhance color rendering property. FIG. 9 is a graph illustrating comparison of spectral characteristics of the orange LED, the white LED, and the Xe tube. FIG. 10 is a graph illustrating the spectral sensitivity outputs of the imaging device in a case where the orange LED is used as a light source, and an orange LED sensitivity coefficient is denoted by o. A table in FIG. 10 illustrates output values of the orange LED sensitivity coefficient o for Red, Green, and Blue.

In FIG. 8, processing in steps S200 to S202 is the same as the processing in steps S100 to S102 in FIG. 2, and description thereof is therefore omitted.

In step S203, the microcomputer 1 controls the emission current deciding unit 13 to perform light emission of the LEDs 6. A light emission ratio of the two colors in the LEDs 6 is decided by an instruction from the camera 20, or is set by a user in the LED flash 10.

In step S204, the microcomputer 1 reads the color information from the color information table recorded in the recording unit 12, based on the light emission ratio in step S203. In the present exemplary embodiment, the color information is (R0, G0, and B0) expressed by RGB.

In step S205, the microcomputer 1 determines whether a camera ID acquired in step S201 indicates a camera capable of performing the WB processing compatible with the LED (hereinafter, compatible camera). In a case where the camera is determined as an incompatible camera (NO in step S205), it is necessary to correct the color information. Therefore, the processing proceeds to step S206. In a case where the camera is determined as a compatible camera (YES in step S205), the processing proceeds to step S209 without correcting the color information.

In step S206, the microcomputer 1 reads color information correction coefficients for two colors recorded in the recording unit 12. The correction coefficients for the white LED and the orange LED are different from each other. Therefore, it is necessary to read each of the white LED sensitivity coefficient w and the orange LED sensitivity coefficient o.

In step S207, the microcomputer 1 corrects, by the light emission ratio, the white LED sensitivity coefficient and the orange LED sensitivity coefficient acquired in step S206, thereby determining definitive color information correction coefficients α. An example in which the light emission ratio is set to white LED:orange LED=2:1 is described here. To determine the color information correction coefficients α, a sensitivity coefficient m(R, G, B) of composite light of the white LED and the orange LED is first determined. An expression of m(R, G, B)=the white LED emission ratio×the white LED emission sensitivity coefficient w+the orange LED emission ratio×the orange LED emission sensitivity coefficient o is established. Accordingly, sensitivity coefficients m(RED), m(GREEN), and m(BLUE) are expressed by expressions 7 to 9.

$$m(\text{RED})=2 \times 0.66+1 \times 3.32=4.64 \quad \text{(Expression 7)}$$

$$m(\text{GREEN})=2 \times 1.27+1 \times 2.81=5.36 \quad \text{(Expression 8)}$$

$$m(\text{BLUE})=2 \times 1+1 \times 1=3 \quad \text{(Expression 9)}$$

After normalization based on the sensitivity coefficient m(BLUE) as 1, the sensitivity coefficient m(RED) becomes 1.55, the sensitivity coefficient m(GREEN) becomes 1.79, and the sensitivity coefficient m(BLUE) becomes 1.

Each of the color information correction coefficients α is determined by dividing the composite sensitivity coefficient m by the Xe tube sensitivity coefficient x in FIG. 6.

Accordingly, α(RED)=1.55÷0.65=2.38, α(GREEN)=1.79÷1.07=1.67, and α(BLUE)=1÷1=1 are obtained.

In step S208, the microcomputer 1 determines, by the following expressions 10 to 12, corrected color information (R1, G1, and B1) from the color information (R0, G0, and B0) acquired in step S204 and the color information correction coefficients α acquired in step S207.

$$R1=R0\div 2.38 \quad \text{(Expression 10)}$$

$$G1=G0\div 1.67 \quad \text{(Expression 11)}$$

$$B1=B0\div 1 \quad \text{(Expression 12)}$$

In step S209, the microcomputer 1 transmits the color information acquired in step S204 or the color information determined in step S208, to the camera 20.

In step S210, the WB processing unit 230 performs the WB processing in a manner similar to step S109, by using the color information transmitted in step S209 from the LED flash 10.

The above-described sequence makes it possible to realize proper WB processing even in the case where the illumination apparatus including the LED light source with the plurality of emission colors is mounted on the camera incompatible with the LED light source.

In the present exemplary embodiment, the description has been given using the LEDs of two colors. The similar processing is applicable even when LEDs of three colors RGB are used or the light emission ratio is changed.

In a third exemplary embodiment, in the case where the illumination apparatus including the LED light source is mounted on the camera incompatible with the LED light source, transmission of the color information at the light emission is inhibited to prevent erroneous WB processing using erroneous information from being performed.

FIG. 11 is a flowchart illustrating an operation sequence of an imaging system according to the present exemplary embodiment. Processing in steps S300 to S305 are the same as the processing in steps S100 to S105 in FIG. 2, and description thereof is therefore omitted.

In a case where the camera is determined as a compatible camera in step S305 (YES in step S305), the microcomputer 1 transmits non-corrected color information to the camera 20 in step S306.

In step S307, the WB processing unit 230 performs the WB processing by using the color information transmitted in step S306 from the LED flash 10. The WB processing is the same as the processing in step S109, and detailed description thereof is therefore omitted.

In a case where the camera is determined as an incompatible camera in step S305 (NO in step S305), the microcomputer 1 terminates the series of operations without transmitting the color information to the camera 20. In the WB processing in a case where the color information is not transmitted from the LED flash 10, color information of external light is used, assuming that light is not emitted from the LED flash 10. As described above, the color information is not transmitted from the LED flash 10, which makes it possible to prevent the camera 20 from performing erroneous WP processing on the premise of the Xe tube.

In the above-described three exemplary embodiments, the example of the imaging system in which the illumination apparatus is mounted on the imaging apparatus has been described; however, the illumination apparatus and the imaging apparatus may not be in physical contact with each other as long as the illumination apparatus and the imaging apparatus are communicable with each other in the imaging system. In other words, the illumination apparatus and the imaging apparatus may not be in physical contact with each other as long as the illumination apparatus and the imaging apparatus are communicable with each other through wireless communication in the imaging system.

Further, the image processing apparatus may not be the imaging apparatus as long as the image processing apparatus performs the WB processing on a captured image based on the color information transmitted from the illumination apparatus.

Moreover, the illumination apparatus and the image processing apparatus may be connected to each other through other external devices such as an adaptor, and the illumination apparatus may not directly transmit the color information to the image processing apparatus as long as the illumination apparatus transmits the color information to the external devices.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-219342, filed Nov. 14, 2017, which is hereby incorporated by reference herein in its entirety.

What is claimed is:
1. An illumination apparatus, comprising:
a first light source; and
a transmitter configured to transmit color information relating to the first light source,
wherein the transmitter transmits, as the color information relating to the first light source, color information that compensates a difference between spectral characteris- tics of a second light source different from the first light source and spectral characteristics of the first light source, wherein, in a case where a transmission destination to which the transmitter transmits the color information relating to the first light source is an image processing apparatus that performs white balance (WB) processing on an image acquired through light emission imaging, based on the spectral characteristics of the second light source, the transmitter transmits, as the color information relating to the first light source, the color information that compensates the difference between the spectral characteristics of the second light source and the spectral characteristics of the first light source, and wherein, in a case where the transmission destination is not the image processing apparatus that performs the WB processing on the image acquired through light emission imaging, based on the spectral characteristics of the second light source, the transmitter does not transmit the color information that compensates the difference between the spectral characteristics of the second light source and the spectral characteristics of the first light source.

2. The illumination apparatus according to claim 1, wherein, in the case where the transmission destination is not the image processing apparatus that performs the WB processing on the image acquired through light emission imaging, based on the spectral characteristics of the second light source, the transmitter transmits the color information indicating the spectral characteristics of the first light source.

3. The illumination apparatus according to claim 1, wherein the second light source is a xenon (Xe) tube.

4. The illumination apparatus according to claim 3, wherein the first light source is a light-emitting diode (LED).

5. The illumination apparatus according to claim 3, wherein the first light source is a plurality of LEDs different in color temperature from one another.

6. The illumination apparatus according to claim 5, wherein the transmitter transmits, as the color information relating to the first light source, the color information that compensates the difference between the spectral characteristics of the second light source and the spectral characteristics of the first light source according to a light emission ratio of the plurality of LEDs.

7. A method of controlling an illumination apparatus that includes a first light source and a transmitter configured to transmit color information relating to the first light source, the method comprising:

causing the transmitter to transmit, as the color information relating to the first light source, color information that compensates difference between spectral characteristics of a second light source different from the first light source and spectral characteristics of the first light source, wherein, in a case where a transmission destination to which the transmitter transmits the color information relating to the first light source is an image processing apparatus that performs white balance (WB) processing on an image acquired through light emission imaging, based on the spectral characteristics of the second light source, the transmitter transmits, as the color information relating to the first light source, the color information that compensates the difference between the spectral characteristics of the second light source and the spectral characteristics of the first light source, and wherein, in a case where the transmission destination is not the image processing apparatus that performs the WB processing on the image acquired through light emission imaging, based on the spectral characteristics of the second light source, the transmitter does not transmit the color information that compensates the difference between the spectral characteristics of the second light source and the spectral characteristics of the first light source.

* * * * *